United States Patent
Ely et al.

(10) Patent No.: US 10,969,866 B1
(45) Date of Patent: Apr. 6, 2021

(54) INPUT MANAGEMENT FOR WEARABLE DEVICES

(71) Applicant: Apple Inc., Cupertino, CA (US)

(72) Inventors: Colin M. Ely, Sunnyvale, CA (US); Brad G. Boozer, Saratoga, CA (US); Erik G. De Jong, San Francisco, CA (US); Hung A. Pham, Oakland, CA (US); Anil K. Kandangath, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 93 days.

(21) Appl. No.: 15/849,564

(22) Filed: Dec. 20, 2017

Related U.S. Application Data (60) Provisional application No. 62/559,449, filed on Sep. 15, 2017.

(51) Int. Cl.
  *G06F 3/01* (2006.01)
  *G06F 3/0488* (2013.01)
  *G04G 21/08* (2010.01)

(52) U.S. Cl.
  CPC ............. *G06F 3/016* (2013.01); *G04G 21/08* (2013.01); *G06F 3/0488* (2013.01)

(58) Field of Classification Search
  CPC ........ G06F 3/016; G06F 3/0488; G04G 21/08
  See application file for complete search history.

(56) References Cited

U.S. PATENT DOCUMENTS

| | | | |
|---|---|---|---|
| 9,939,784 B1* | 4/2018 | Berardinelli | G06F 21/35 |
| 2012/0274508 A1* | 11/2012 | Brown | G04F 10/00 |
| | | | 342/357.25 |
| 2015/0111558 A1 | 4/2015 | Yang | |
| 2016/0041597 A1 | 2/2016 | Graham et al. | |
| 2016/0062608 A1* | 3/2016 | Foss | G06F 3/0481 |
| | | | 715/739 |
| 2016/0170598 A1* | 6/2016 | Zambetti | G06F 3/0485 |
| | | | 715/784 |
| 2017/0153737 A1 | 6/2017 | Chawda et al. | |
| 2017/0265074 A1* | 9/2017 | Li | H04B 1/385 |
| 2017/0308118 A1* | 10/2017 | Ito | G06F 3/017 |
| 2017/0371479 A1* | 12/2017 | Li | G06F 3/016 |

FOREIGN PATENT DOCUMENTS

WO WO-2015/122885 A1 8/2015

* cited by examiner

*Primary Examiner* — Tadesse Hailu
(74) *Attorney, Agent, or Firm* — Morgan, Lewis & Bockius LLP (57) ABSTRACT

Wearable electronic devices, such as watches, can be provided with an ability to detect whether a tactile input provided to an input component, such as a button, is intentional or unintentional. For example, a wearable device can analyze the context in which a tactile input is received, such as attributes of the tactile input and/or operational parameters of the wearable device at the time the tactile input is received. By further example, a wearable device can infer whether a tactile input is a result of an activity, such as exercising, random movement, or collision with an object. The wearable devices can accept or reject the tactile input and determine whether an action associated with the tactile input should be performed.

12 Claims, 4 Drawing Sheets

INPUT MANAGEMENT FOR WEARABLE DEVICES

CROSS-REFERENCE TO RELATED APPLICATION

This application claims the benefit of U.S. Provisional Application No. 62/559,449, entitled "INPUT MANAGEMENT FOR WEARABLE DEVICES," filed Sep. 15, 2017, the entirety of which is incorporated herein by reference.

FIELD

The described embodiments relate generally to wearable devices having user input capabilities. More particularly, the present embodiments relate to input management for wearable devices.

BACKGROUND

Portable electronic devices have become increasingly popular, and the features and functionality provided by portable electronic devices continue to expand to meet the needs and expectations of many consumers. User interface features are often provided on electronic devices to allow a user to provide commands for execution by the devices. Many devices include input components, such as buttons, that receive and detect tactile input from a user during operation. Such input components may be prominently featured on the device for ready access by a user.

However, some traditional portable electronic devices, particularly wearable electronic devices, may be acted upon unintentionally. In such cases, the devices may proceed to perform an action that is associated with activation of a button, even when the activation occurs unintentionally.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The following disclosure relates generally to wearable devices having user input capabilities. More particularly, the following disclosure relates to input management systems and methods for wearable devices, such as watches.

Wearable devices can include one or more input components, such as buttons, at an external surface thereof for receiving tactile input from a user. The input components can provide an ability for the user to provide instructions to the wearable device, which can then perform actions corresponding to the instructions received from the user. It can be desirable to provide easy access to such input components, so that the user can readily achieve performance of the corresponding actions. However, where input components are exposed to an external environment, the user or an object can inadvertently and unintentionally activate the input component, which may cause the wearable device to perform the action contrary to the desires of the user. The user may then be required to take steps to terminate or cancel the action. In some cases, the action may be performed without the knowledge of the user and with a result that is not desired by the user.

According to embodiments disclosed herein, wearable devices can be provided with an ability to detect whether a tactile input provided to an input component is intentional or unintentional. For example, a wearable device can analyze the context in which a tactile input is received, such as attributes of the tactile input and/or operational parameters of the wearable device at the time the tactile input is received. By further example, a wearable device can infer whether a tactile input is a result of an activity, such as exercising, random movement, or collision with an object. The wearable devices can accept or reject the tactile input and determine whether an action associated with the tactile input should be performed.

Various types of contextual information can be used to determine whether a tactile input should be accepted or rejected. Attributes of a tactile input, such as duration of a tactile input and/or duration between tactile inputs, can be considered. Further, operational parameters, such as display state, orientation, and/or motion, of the wearable electronic device can be considered.

According to embodiments disclosed herein, a determination of whether to accept or reject a tactile input can be primarily software-based. For example, a tactile input can be received with hardware of the wearable electronic device, and the determination of whether to perform an action can be performed based on software programming of the wearable electronic device. Accordingly, the determinations can be made without significantly altering the hardware or requiring custom configurations thereof. As such, aspects of the present disclosure can be implemented at least in part in software and applied to a wide variety of hardware components.

According to embodiments disclosed herein, a wearable electronic device can include a display, an input component for receiving a tactile input from a user, and a processor configured to detect the tactile input. The processor can perform an action if a duration of the tactile input exceeds a first threshold while the display is active, or the duration of the tactile input exceeds a second threshold, greater than the first threshold, while the display is inactive.

According to some embodiments, disclosed herein is a method for operating a wearable electronic device. The method can include receiving, with an input component of the wearable electronic device, a first tactile input and a second tactile input from a user, and determining, with a processor of the wearable electronic device, whether to perform an action, wherein the determining is based on a duration of time between receiving the first tactile input and receiving the second tactile input and at least one of a display state of the wearable electronic device, an orientation of the wearable electronic device, and motion of the wearable electronic device.

According to some embodiments, disclosed herein is a method for operating a wearable electronic device. The method can include receiving, with an input component of the wearable electronic device, a tactile input from a user, and determining, with a processor of the wearable electronic device, whether to perform an action, wherein the determining is based on a duration of the tactile input and at least one of a display state of the wearable electronic device, an orientation of the wearable electronic device, and motion of the wearable electronic device.

These and other embodiments are discussed below with reference to FIGS. 1-7. However, those skilled in the art will readily appreciate that the detailed description given herein with respect to these Figures is for explanatory purposes only and should not be construed as limiting.

Figure 1:
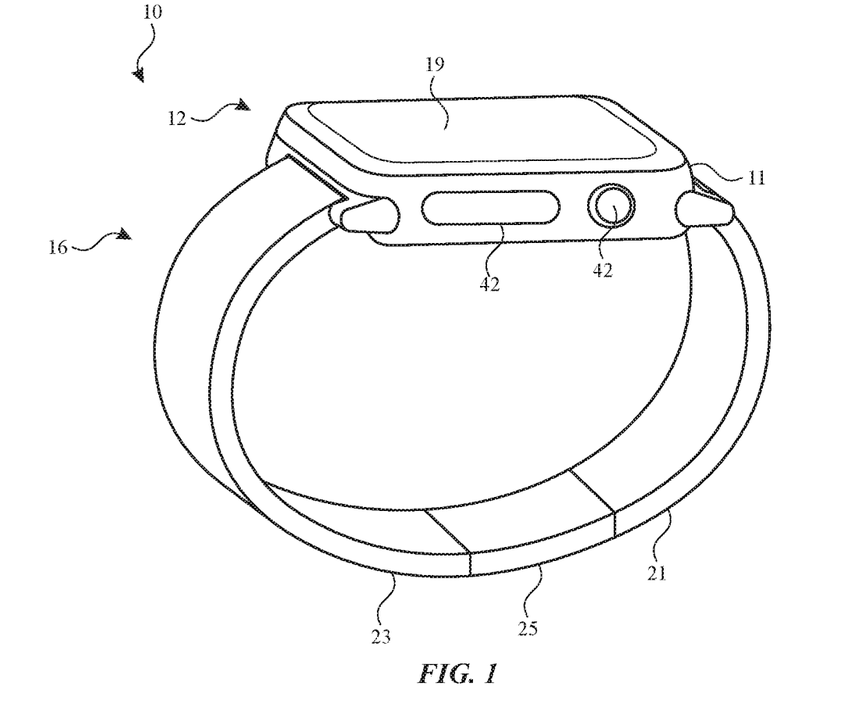
FIG. 1 shows a perspective view of an exemplary watch.

Referring to FIG. 1, an exemplary wearable electronic device, such as a watch 10, is shown. While FIG. 1 illustrates the device as the watch 10, it will be recognized that features described herein with respect to the watch 10 can be applied to a variety of other devices, such as other wearable devices, other electronic devices, portable computing devices, cell phones, smart phones, tablet computers, laptop computers, cameras, timekeeping devices, computerized glasses, and other wearable devices navigation devices, displays, sports devices, accessory devices, health-monitoring devices, medical devices, wristbands, bracelets, jewelry, and/or the like.

As shown in FIG. 1, the watch 10 includes a watch body 12 that can be attached to a user (e.g., a user's wrist) using a watch band 16. The watch band 16 includes a first band strap 21 and a second band strap 23. Free ends of the first band strap 21 and the second band strap 23 are connected with a clasp 25.

One of the components included in the watch body 12 can be one or more I/O systems. For example, a display 19 can be configured to output various information about the watch body 12. The display 19 can also be configured to receive input. The watch body 12 can include a housing 11 that supports the display 19. The housing 11 serves to surround a peripheral region of the watch body 12 as well as support the internal components of the watch body 12 in their assembled position. For example, the housing 11 encloses and supports various internal components (including for example integrated circuit chips, processors, memory devices and other circuitry) to provide computing and functional operations for the watch body 12.

The watch body 12 can also have other input mechanisms for receiving tactile input from a user. For example, the watch body 12 can include or interface with one or more input components, such as buttons 42. While FIG. 1 shows two particular types of buttons 42, other input components are contemplated. For example, exemplary input components include buttons, crowns, keys, dials, switches, trackpads, and the like. As used herein, an input component can be any device that is configured to receive and detect tactile input from a user. The tactile input can depress, rotate, move, tilt, flex, or deform the button 42 in a manner that is detectable by the button 42. The buttons 42 can include or be connected to one or more sensors that detect the tactile input. Sensors can include, for example, force sensors, pressure sensors, optical sensors, or proximity sensors. As shown in FIG. 1, the watch body 12 can include multiple buttons 42, although it will be recognized that any number of buttons 42 can be provided. Where multiple buttons 42 are provided, the buttons 42 can be of the same or different types (e.g., depressable and/or rotatable).

Operation of the buttons 42 can have one or more of a variety of effects. For example, in response to a tactile input received by a button 42, the watch can perform one or more of a variety of actions. While such actions can include any preprogrammed or user-selected action, various examples are provided herein by way of illustration and not limitation. For example, such actions can include launching a program, displaying particular information, changing an aspect of the display, communicating with an external device, initiating a call, sending a message, activating a microphone for receiving and recognizing voice input from the user, providing a sound, initiating a financial transaction, restarting the watch, turning off the watch, taking a screenshot, activating the screen, tracking activity of the user, taking a biometric reading, recording a location of the user, and/or modifying settings of the watch. An action can be general across an operating system of a watch, such that the action can be performed at any time during operation of the watch. Additionally or alternatively, an action can be specific to an application that is actively operating on the watch, such that the action can only be performed when the application is active. An action can be specific to a particular combination of buttons receiving tactile input simultaneously or in a particular sequence. Accordingly, a tactile input can include input provided to more than one button. An action can be specific to other contextual factors, such as an attribute of a tactile input or an operational parameter of the watch, as discussed further herein.

Figure 2:
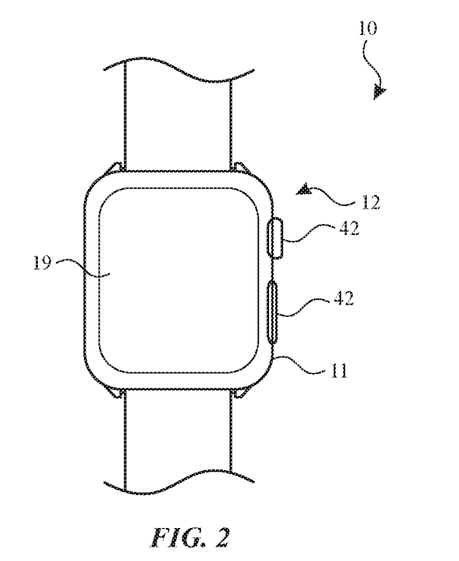
FIG. 2 shows a front view of a portion of the watch of FIG. 1.

As shown in FIG. 2, buttons 42 can protrude from a surface of the housing 11. As further shown in FIG. 2, buttons 42 can be positioned on a side of the housing 11. Such a configuration allows the buttons 42 to be readily accessible by a user without interfering with a user's view and usage of the display 19.

Figure 3:
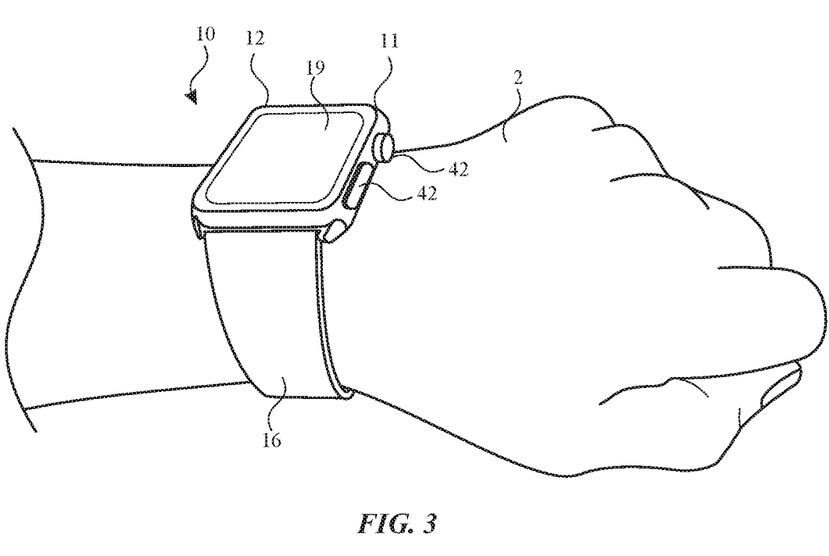
FIG. 3 shows a perspective view of the watch of FIG. 1 on a user.

Referring to FIG. 3, the watch body 12 of the watch 10 can be secured to a wrist of a user 2 with the watch band 16. While secured to the user 2, the watch body 12 can be oriented such that the display 19 faces away from the wrist. While the watch 10 is worn on one wrist, the buttons 42 can be acted upon by the user 2, for example with fingers of an opposing hand. The buttons 42 can be positioned at the surface of the housing 11 on a side thereof between the display 19 and the wrist. Accordingly, the buttons 42 can be near the hand, other body parts, and/or other objects on or near the user 2.

Figure 4:
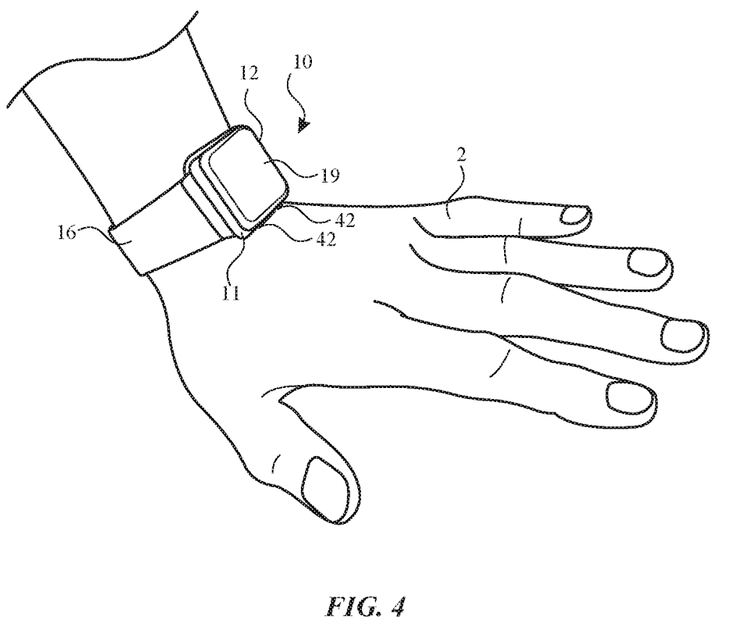
FIG. 4 shows a perspective view of the watch of FIG. 1 on the user.

Referring to FIG. 4, when the user 2 flexes the hand at the wrist, the hand or another object can contact the buttons 42 of the watch body 12. This can occur, for example, when the hand is laid flat against a surface and the user places weight on the hand. By further example, this can occur when the user is exercising, performing pushups, holding an object, gripping handlebars (e.g., of a bicycle), stretching, leaning against a wall, table, or other surface. It will be recognized that other body parts and objects on or near watch 10 hand can also contact the buttons 42. For example, flexion of the hand at the wrist can bring another object, such as gloves, wristbands, bracelets, and/or jewelry into contact with the buttons 42. By further example, incidental collisions with objects can also act on the buttons 42. Some routine activities, such as the user putting a hand through backpack straps, pockets, or clothing, can provide tactile input to the buttons 42.

These and other types of contact can be received and detected by the buttons 42 as a tactile input similar in at least some respects to tactile input provided by fingers of an opposing hand when operating the watch 10. The buttons 42 may have a structure and hardware architecture that, alone, is unable to distinguish between an intentional tactile input from a user's fingers and an unintentional tactile input from another body part or object. As described further herein, the watch 10 can include one or software implemented methods for distinguishing between intentional and unintentional tactile inputs.

Figure 5:
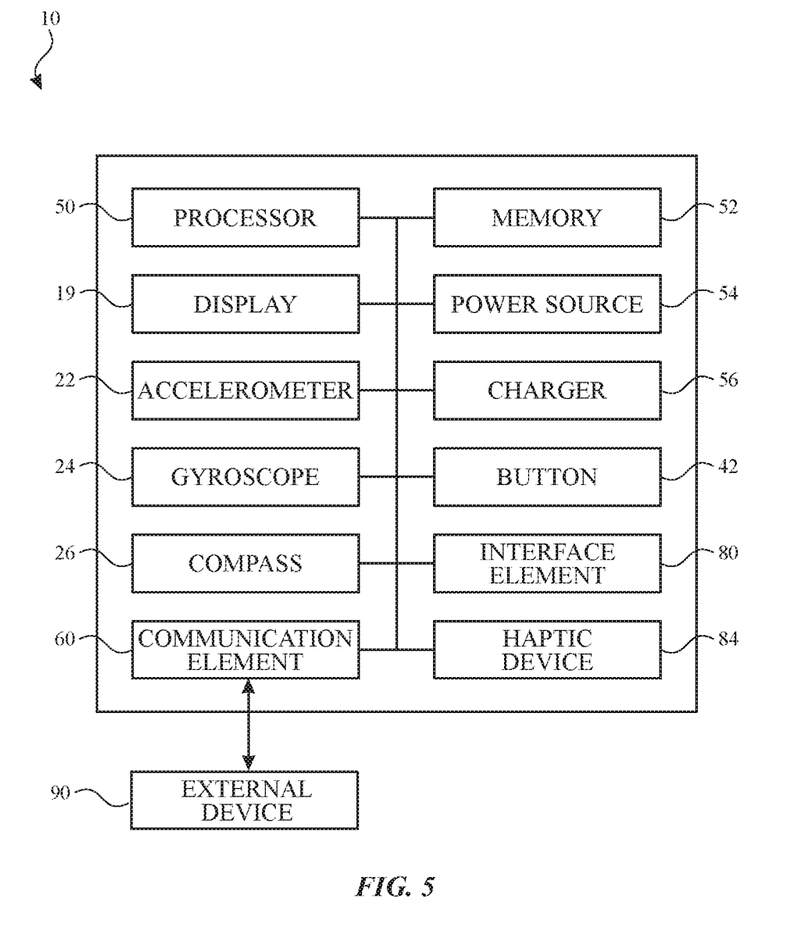
FIG. 5 shows a block diagram of an exemplary watch.

As shown in FIG. 5, the watch 10 includes a processor 50, memory 52, a power source 54, and/or a charger 56 for providing power to the power source 54. The processor 50 can control or coordinate some or all of the operations of the watch 10. The processor 50 can communicate, either directly or indirectly with substantially all of the components of the watch 10. For example, a system bus or signal line or other communication mechanisms can provide communication between the processor 50, the memory 52, the power source 54, as well as other components. The processor 50 can be implemented as any electronic device capable of processing, receiving, or transmitting data or instructions. As described herein, the term "processor" is meant to encompass a single processor or processing unit, multiple processors, multiple processing units, or other suitably configured computing element or elements.

The memory 52 can store electronic data that can be used by the watch 10. For example, a memory can store electrical data or content such as, for example, audio and video files, documents and applications, device settings and user preferences, timing and control signals or data for a haptic device 84, data structures or databases, and so on. The memory 52 can be configured as any type of memory. By way of example only, the memory can be implemented as random access memory, read-only memory, Flash memory, removable memory, or other types of storage elements, or combinations of such devices.

The display 19 may provide an image or video output for the watch 10. The display 19 may also provide an input surface for one or more input devices such as a touch sensing device, force sensing device, temperature sensing device, and/or a fingerprint sensor. The display 19 may be any size suitable for inclusion at least partially within the housing of the watch 10 and may be positioned substantially anywhere on the watch 10. Other input components, such as button 42 can be provided as discussed above.

The watch 10 can include components that provide situational awareness for the user during an operation. For example, the watch 10 can include an accelerometer 22, a gyroscope 24, and/or a compass 26. During use, the accelerometer 22 can track and record acceleration of the watch 10. Acceleration can be measured in a three-dimensional (x, y, and z) coordinate system. For example, the accelerometer 22 can have at least three components that each measure acceleration in one of three mutually orthogonal axes. By combining the measurements of all components, acceleration in the three-dimensional coordinate system can be determined. The accelerometer 22 can be configured to measure and record acceleration at several points in time during a sampling period. For example, the measurements can be taken at regular intervals of time. Other components of the watch 10, such as the gyroscope 24 and/or the compass 26, can be used to measure orientation and/or motion of the watch 10. The watch 10 can also include other components, such as a GPS receiver, that can be used to measure or calculate the position, velocity, and/or acceleration of the watch 10.

A power source 54 can be implemented with any device capable of providing energy to the watch 10. For example, the power source 54 can be a battery and/or a connection cable that connects the charger 56 to another power source such as a wall outlet. In other examples, wireless power can be used.

In some embodiments, as shown in FIG. 5, the watch 10 can include components for interacting with a user. In some embodiments, the watch 10 includes a display 19, a user interface element 80 (e.g., a speaker and/or a microphone), and/or a haptic device 84.

The haptic device 84 can be implemented as any suitable device configured to provide force feedback, vibratory feedback, tactile sensations, and the like. For example, in one embodiment, the haptic device 84 may be implemented as a linear actuator configured to provide a punctuated haptic feedback, such as a tap or a knock.

A communication element 60 can facilitate transmission of data to or from other, externals devices 90 across standardized or proprietary protocols. For example, a communication element 60 can transmit electronic signals via a wireless and/or wired network connection. Examples of wireless and wired network connections include, but are not limited to, cellular, Wi-Fi, Bluetooth, infrared, RFID, and Ethernet. The external device 90 can be a smartphone, a computer, a server, a headset, or another electronic device.

Figure 6:
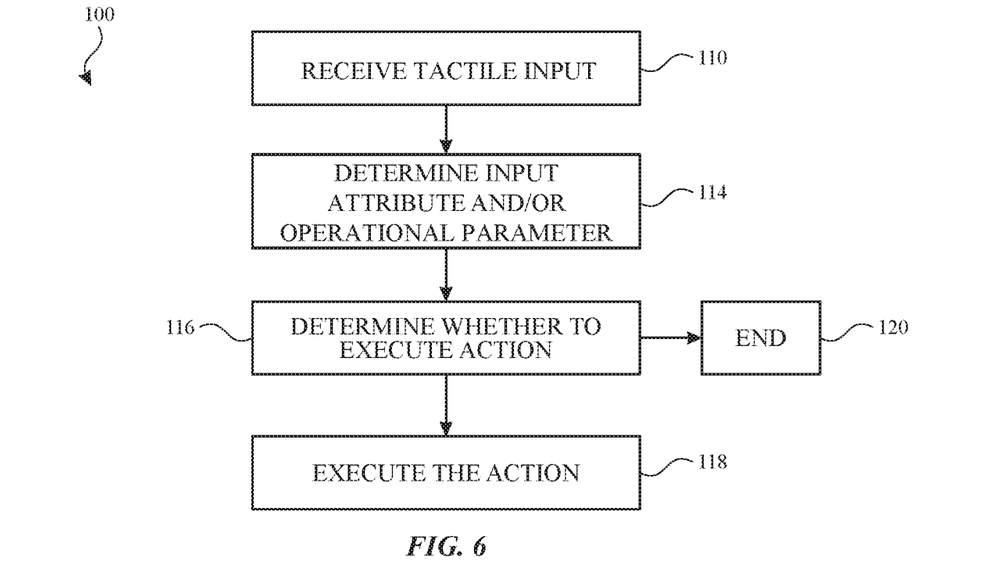
FIG. 6 shows a flow chart of an exemplary method.

Referring to FIG. 6, a method can be performed to determine whether a tactile input should be accepted or rejected and whether an associated action should be performed. An exemplary method 100 can be implemented, for example, by a processor based on programming stored in memory of a watch.

In operation 110, a tactile input is received and detected, for example, by a button or other input component of a watch. The tactile input may be an intentional input from a user or an unintentional input from a user or other source.

In operation 114, the processor of the watch can determine one or more aspects relating to the tactile input. For example, various types of contextual information can be referenced. Attributes of a tactile input, such as duration and magnitude of a tactile input can be considered. Further, operational parameters of the watch can be considered. Such operational parameters can include display state, orientation, and/or motion of the watch. A period of time from which operational parameters are considered can include time before, during, and/or after the tactile input is received.

In operation 116, the processor of the watch can determine whether the tactile input should be accepted or rejected and whether a corresponding action should be performed. The determination can be made based on one or more criteria, as discussed further herein. If the processor determines that the tactile input should be accepted, then the processor can perform the action in operation 118. If the processor determines that the tactile input should be rejected, then the processor can end the process in operation 120.

The processor can determine whether to accept or reject a tactile input based, at least in part, on a duration of the tactile input. When a user intentionally interacts with the watch, it is more likely that the user will provide a tactile input that is of significant duration. In particular, the user may believe that a minimum duration is required to accept the tactile input. Conversely, tactile inputs of the shortest duration will be recognized as likely incidental and unintentional. Accordingly, tactile inputs can be rejected or subject to more stringent filters when the duration of the tactile input does not exceed a duration threshold.

For example, the tactile input can be accepted and a first action performed if the duration thereof exceeds a first duration threshold, and the tactile input can be rejected if the duration thereof does not exceed the first duration threshold. For example, the first duration threshold can be about or at least about 50 milliseconds. By further example, the first duration threshold can be about or at least about 10, 20, 30, 40, 50, 60, 70, 80, 90, or 100 milliseconds.

In some circumstances, the threshold for performing the first action can be different if certain other criteria are met, as discussed further herein. For example, if criteria relating to an attribute of the tactile input and/or operational parameters of the watch are satisfied, then the tactile input can be accepted and the first action performed if the duration thereof exceeds a second duration threshold, and the tactile input can be rejected if the duration thereof does not exceed the second duration threshold. The second duration threshold can be greater than the first duration threshold. For example, the second duration threshold can be about or at least about 150 milliseconds. By further example, the second duration threshold can be about or at least about 100, 110, 120, 130, 140, 150, 160, 170, 180, 190, or 200 milliseconds.

Additionally or alternatively, the tactile input can be accepted and a second action performed if the duration thereof exceeds a third duration threshold, different than the first duration threshold. The second action can be different from the first action, such that different actions are available based on different tactile inputs to the same button. For example, the third duration threshold can be about or at least about 400 milliseconds. By further example, the third duration threshold can be about or at least about 350, 360, 370, 380, 390, 400, 410, 420, 430, 440, or 450 milliseconds.

The processor can determine whether to accept or reject a tactile input based, at least in part, on a display state of the watch during a period of time in which the tactile input is received. When a user intentionally interacts with the watch, it is more likely that the user will ensure that the display is active (i.e., "on") before providing a tactile input. Conversely, when a display of a watch is inactive (i.e., "off"), it can be inferred that the user likely did not intentionally interact with the watch by providing the detected tactile input. Accordingly, tactile inputs can be rejected or subject to more stringent filters (e.g., duration threshold) when the display is inactive.

The processor can determine whether to accept or reject a tactile input based, at least in part, on an orientation of the watch during a period of time in which the tactile input is received. When a user intentionally interacts with the watch, it is more likely that the user will orient the watch in one of various viewing orientations before providing a tactile input. For example, a user will often orient the watch so that the display is directed toward the face of the user during intentional interactions. It will be recognized that a range of angles in a coordinate system can represent orientations corresponding to a user viewing the display. Conversely, when the watch is oriented so that the display is directed away from the face of the user, it can be inferred that the user likely did not intentionally interact with the watch by providing the detected tactile input. Orientation of the watch can be detected, for example, by an accelerometer, a gyroscope, and/or compass of the watch. The detected orientation can be compared to an orientation threshold that distinguishes between orientations relating to intentional user inputs (e.g., viewing orientations) and orientations relating to unintentional user inputs. Accordingly, tactile inputs can be rejected or subject to more stringent filters (e.g., duration threshold) when the watch is not in a viewing orientation.

The processor can determine whether to accept or reject a tactile input based, at least in part, on motion of the watch during a period of time in which the tactile input is received. When a user intentionally interacts with the watch, it is more likely that the user will stabilize the watch before providing a tactile input. For example, a user will often grasp the watch on opposing sides or press it against a body part when providing tactile input. Conversely, when the watch is moving, accelerating, changing directions, and/or vibrating, it can be inferred that the user likely did not intentionally interact with the watch by providing the detected tactile input. Motion of the watch can be detected, for example, by an accelerometer, a gyroscope, and/or compass of the watch. The detected motion can be compared to a motion threshold that distinguishes between motions relating to intentional user inputs (e.g., less motion) and motions relating to unintentional user inputs (e.g., more motion). Accordingly, tactile inputs can be rejected or subject to more stringent filters (e.g., duration threshold) when the watch is in motion (e.g., motion exceeds a motion threshold).

One or more of the criteria described herein can be applied. For example, a single criterion can be applied. By further example, two or more of the criteria described herein can be combined such that multiple criteria must be satisfied to accept a tactile input. The determination to accept a tactile input and/or perform an associated action can be based on a duration of the tactile input and at least one of a display state of the wearable electronic device, an orientation of the wearable electronic device, and motion of the wearable electronic device A tactile input can be accepted and an associated action performed if and/or only if (1) the duration of the tactile input exceeds a duration threshold and (2) the display state of the watch during a period of time in which the tactile input is received is an active state. A tactile input can be accepted and an associated action performed if and/or only if (1) the duration of the tactile input exceeds a duration threshold and (2) the orientation of the wearable electronic device during a period of time in which the tactile input is received corresponds to a viewing orientation for viewing the wearable electronic device by a user. A tactile input can be accepted and an associated action performed if and/or only if (1) the duration of the tactile input exceeds a duration threshold and (2) the motion of the wearable electronic device during a period of time in which the tactile input is received does not exceed a motion threshold. It will be recognized that other combinations of these and other criteria are contemplated.

Figure 7:
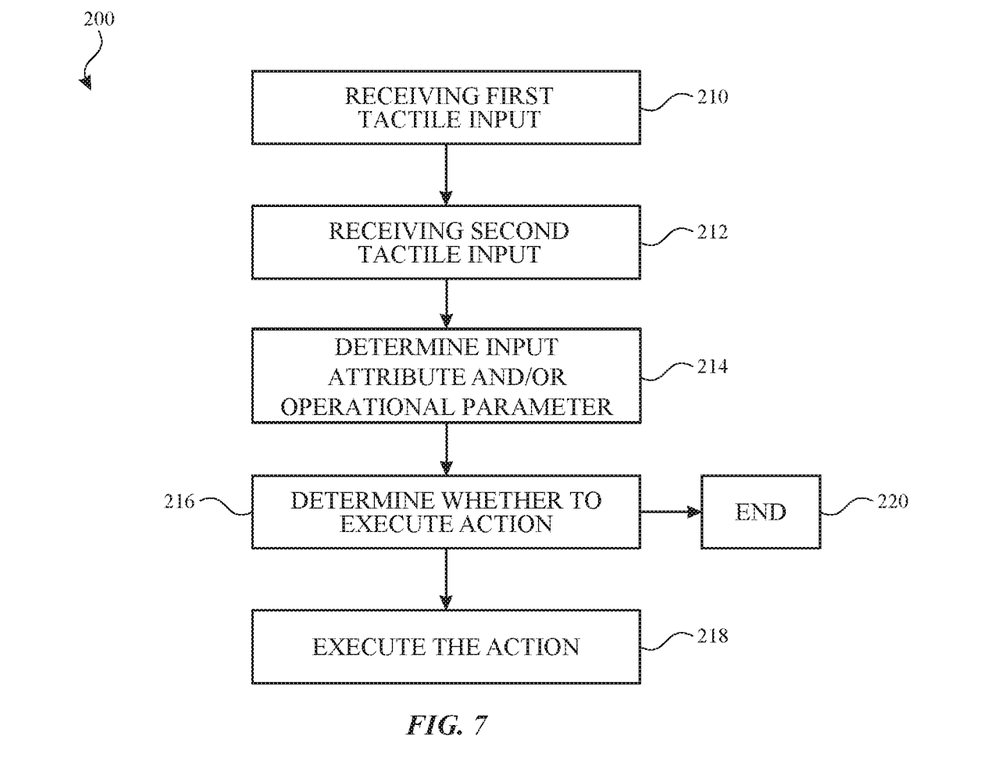
FIG. 7 shows a flow chart of an exemplary method.

Referring to FIG. 7, a method can be performed to determine whether one of two tactile inputs should be accepted or rejected and whether an associated action should be performed. An exemplary method 200 can be implemented, for example, by a processor based on programming stored in memory of a watch.

In operation 210, a first tactile input is received and detected, for example, by a button or other input component of a watch. It will be recognized that method 200 can be an extension or continuation of the method 100 illustrated in FIG. 6. For example, the receipt and detection of the first tactile input in operation 210 of method 200, shown in FIG. 7, can correspond to the receipt and detection of a tactile input in operation 110 of method 100, shown in FIG. 6. A first tactile input can optionally be independently evaluated to determine whether an action should be performed. Where the first tactile input is rejected and a second tactile input is received, additional operations can be performed, as further illustrated with respect to method 200.

In operation 212, the second tactile input is received and detected by the same button or other input component of the watch. The tactile inputs may be an intentional input from a user or an unintentional input from a user or other source. While the first tactile input can be rejected, the method 200 can include further operations after the second tactile input is received.

In operation 214, the processor of the watch can determine one or more aspects relating to the tactile inputs. For example, various types of contextual information can be referenced. Attributes of the tactile inputs, such as duration and magnitude of a tactile inputs and duration of time between the tactile inputs can be considered. Further, operational parameters of the watch can be considered, as discussed above. A period of time from which operational parameters are considered can include time before, during, and/or after one or both of the tactile inputs are received.

In operation 216, the processor of the watch can determine whether the tactile inputs should be accepted or rejected and whether a corresponding action should be performed. The determination can be made based on one or more criteria, as discussed further herein. If the processor determines that the tactile inputs should be accepted, then the processor can perform the action in operation 218. If the processor determines that the tactile inputs should be rejected, then the processor can end the process in operation 220.

The processor can determine whether to accept or reject a tactile input based, at least in part, on a duration of one or both of the tactile inputs, as discussed above. When a user intentionally interacts with the watch and the first tactile input does not result in the desired acceptance and action performance, it is more likely that the user will provide the second tactile input of a longer duration. In particular, the user may believe that a minimum duration is required to accept the tactile input and that the first tactile input did not satisfy the required duration. Conversely, a second tactile input of short duration (e.g., shorter than the duration of the first tactile input or shorter than a particular threshold) will be recognized as likely incidental and unintentional. Accordingly, tactile inputs can be rejected or subject to more stringent filters when the duration of the second tactile input is shorter than the duration of the first tactile input or does not exceed a duration threshold.

The processor can determine whether to accept or reject a tactile input based, at least in part, on a duration of time between the first and second tactile inputs. When a user intentionally interacts with the watch and the first tactile input does not result in the desired acceptance and action performance, it is more likely that the user will provide, shortly thereafter, the second tactile input. In particular, the user may provide consecutive tactile inputs in a shorter time than is likely to occur with incidental inputs. Conversely, tactile inputs that are separated by long durations of time will be recognized as likely incidental and unintentional. Accordingly, tactile inputs can be rejected or subject to more stringent filters when the duration of time between the tactile inputs exceeds a gap threshold.

For example, the second tactile input can be accepted and an action performed if the duration of time between the first and second tactile inputs does not exceed a gap threshold, and the second tactile input can be rejected if the duration of time exceeds the gap threshold. For example, the first duration threshold can be about or at least about 1 second. By further example, the gap threshold can be about or at least about 0.5, 1.0, 1.5, or 2.0 seconds.

By further example, the gap threshold can be a range having upper and lower bounds. The second tactile input can be accepted and an action performed if the duration of time between the first and second tactile inputs is within the gap threshold, and the second tactile input can be rejected if the duration of time is outside the gap threshold. For example, the first duration threshold can be a range of about 0.5-2.0 seconds, 0.5-1.5 seconds, 0.5-1.0 seconds, 1.0-1.5 seconds, or 1.0-2.0 seconds.

The processor can determine whether to accept or reject tactile inputs based, at least in part, on a display state of the watch during a period of time in which the tactile inputs are received, as described above. Accordingly, tactile inputs can be rejected or subject to more stringent filters (e.g., gap threshold) when the display is inactive.

The processor can determine whether to accept or reject tactile inputs based, at least in part, on an orientation of the watch during a period of time in which the tactile inputs are received, as described above. Accordingly, tactile inputs can be rejected or subject to more stringent filters (e.g., gap threshold) when the watch is not in a viewing orientation.

The processor can determine whether to accept or reject tactile inputs based, at least in part, on motion of the watch during a period of time in which the tactile inputs are received, as described above. Accordingly, tactile inputs can be rejected or subject to more stringent filters (e.g., gap threshold) when the watch is in motion (e.g., motion exceeds a motion threshold).

One or more of the criteria described herein can be applied. For example, a single criterion can be applied. By further example, two or more of the criteria described herein can be combined such that multiple criteria must be satisfied to accept multiple tactile inputs. The determination to accept tactile inputs and/or perform an associated action can be based on a duration of time between receiving the first tactile input and receiving the second tactile input and at least one of a display state of the wearable electronic device, an orientation of the wearable electronic device, and motion of the wearable electronic device Tactile inputs can be accepted and an associated action performed if and/or only if (1) the duration of time between receiving the first tactile input and receiving the second tactile input does not exceed a gap threshold and (2) the display state of the wearable electronic device is an active state. A tactile input can be accepted and an associated action performed if and/or only if (1) the duration of time does not exceed a gap threshold and (2) the orientation of the wearable electronic device during a period of time in which the first tactile input and the second tactile input are received corresponds to a viewing orientation for viewing the wearable electronic device by a user. A tactile input can be accepted and an associated action performed if and/or only if (1) the duration of time does not exceed a gap threshold and (2) the motion of the wearable electronic device during a period of time in which the first tactile input and the second tactile input are received does not exceed a motion threshold. It will be recognized that other combinations of these and other criteria are contemplated.

While first and second tactile inputs are described, it will be recognize that any number of tactile inputs can be evaluated to determine whether an action should be performed. For example, three or more tactile inputs, each of detectable duration and separated by detectable durations of time, can be evaluated in accordance with the disclosure provided herein. Different actions can be performed based on the variety of tactile inputs that can be received. For example, different actions can be associated with short-duration single tactile inputs, short-duration double tactile inputs, short-duration triple tactile inputs, long-duration single tactile inputs, and combinations thereof. One or more duration and/or gap thresholds can be applied to one or more tactile inputs, as described herein.

Where multiple thresholds are applied, the thresholds can be applied sequentially, such that a second threshold is applied only if a first threshold is satisfied. In such a sequence, the processing requirements of the thresholds can be reduced in instances where only some of the thresholds are applied. It will be recognized that the thresholds can be applied in any order.

Additionally or alternatively, multiple thresholds can be applied in parallel and/or simultaneously. For example, the thresholds can be applied and the results thereof can be determined later. The application of thresholds can include assigning a score or rating to an attribute of a tactile input and/or an operational parameter of the watch. For example, the comparison of a threshold to an attribute or parameter can yield a numerical value that represents a deviation from the threshold. The numerical values can be combined (e.g., arithmetically) and the combined value can be compared to an aggregate threshold to determine whether the tactile input should be accepted or rejected and the associated action performed.

Thresholds described herein can be preprogrammed, user-selectable, user-adjustable, and/or automatically adjustable. One or more of the thresholds can be subject to a training session, in which the watch prompts the user to provide tactile inputs and/or observes tactile inputs provided by the user without prompting. The watch can determine whether inputs of a certain duration and are separated by a certain duration are intended by the user to be accepted by the watch. For example, one or more actions associated with a tactile input can be manually canceled by a user when the watch initiates the action. Based on a record of canceled actions, the watch can determine which tactile inputs are intended and which are unintended. Thresholds and other parameters can be adjusted so that the watch's responses to tactile inputs better represent the user's desired outcomes.

One or more of the thresholds (e.g., duration and/or gap thresholds) described herein can be preprogrammed, user-selectable, user-adjustable, and/or automatically adjustable. One or more of the thresholds can be subject to a training session, in which the watch prompts the user to provide tactile inputs and/or observes tactile inputs provided by the user without prompting. The watch can determine whether inputs of a certain duration and are separated by a certain duration are intended by the user to be accepted by the watch. For example, one or more actions associated with a tactile input can be manually canceled by a user when the watch initiates the action. Based on a record of canceled actions, the watch can determine which tactile inputs are intended and which are unintended. Thresholds and other parameters can be adjusted so that the watch's responses to tactile inputs better represent the user's desired outcomes.

It will be recognized that, when a tactile input is rejected, the watch can take no further action or perform a different action than the action that would have been performed if the tactile input had been accepted. For example, the watch can provide confirmation to a user (e.g., via a user interface) that a tactile input has been accepted or rejected. By further example, the watch can prompt the user to confirm whether the tactile input should be accepted or rejected. By further example, the watch can activate a display thereof if the tactile input is rejected. In particular, if the determination whether to accept or reject the tactile input is based, at least in part, on the display of the watch being in an inactive state, the display can be activated upon rejection of the tactile input. Accordingly, a subsequent tactile input provided when the display remains in the active state can have a different result.

It will be recognized that certain actions may not be subject to determinations described herein. In particular, certain actions can be performed by the watch regardless of a duration of a tactile input, a duration of time between tactile inputs, a display state, motion of the watch, and/or an orientation of the watch. For example, the watch can be turned off or restarted based solely on a duration of a tactile input, regardless of other factors. By further example, the watch can initiate a call, such as an emergency call, based solely on a duration of a tactile input, regardless of other factors. By further example, the watch can activate a display thereof based solely on the detection of a tactile input, regardless of other factors.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A wearable electronic device comprising:
   a display;
   a button for receiving a depression of the button from a user; and
   a processor configured to detect the depression of the button and perform an action if:
      a duration of the depression of the button exceeds a first threshold while the display is active; or
      the duration of the depression of the button exceeds a second threshold, greater than the first threshold, while the display is inactive, wherein the action is a first action and the processor is further configured to perform a second action, different from the first action, if the duration of the depression of the button exceeds a third threshold that is greater than the first threshold and the second threshold, wherein the first threshold is at least about 50 milliseconds, the second threshold is at least about 150 milliseconds, and the third threshold is at least about 400 milliseconds.

2. The wearable electronic device of claim 1, wherein the wearable electronic device is a watch comprising a watch body and a watch band configured to secure the watch body to the user, the button protruding beyond a surface of the watch body.

3. The wearable electronic device of claim 2, wherein the button is configured to be depressed or rotated relative to a housing of the watch body.

4. The wearable electronic device of claim 1, wherein the action comprises activating a user interface element of the wearable electronic device.

5. The wearable electronic device of claim 1, wherein the action comprises activating a microphone of the wearable electronic device for receiving and recognizing voice input from the user.

6. The wearable electronic device of claim 1, wherein the action comprises communicating between the wearable electronic device and an external device.

7. The wearable electronic device of claim 1, wherein the processor is further configured to perform the action only if motion of the wearable electronic device within a period of time in which the depression of the button is received does not exceed a motion threshold.

8. The wearable electronic device of claim 1, wherein the processor is further configured to perform the action only if an orientation of the wearable electronic device corresponds to a viewing orientation for viewing the wearable electronic device by the user.

9. A method for operating a wearable electronic device, the method comprising:
   receiving, with a button of the wearable electronic device, a first depression of the button and a second depression of the button;
   determining, with a processor of the wearable electronic device, whether to perform an action, wherein the determining is based on a duration of time between receiving the first depression of the button and receiving the second depression of the button and at least one of: a display state of the wearable electronic device, an orientation of the wearable electronic device, and motion of the wearable electronic device; and performing the action if:
the duration of time does not exceed a gap threshold; and
the display state of the wearable electronic device is an active state.

10. The method of claim 9, wherein the gap threshold is at least about 1 second.

11. A method for operating a wearable electronic device, the method comprising:

receiving, with a button of the wearable electronic device, a first depression of the button and a second depression of the button;

determining, with a processor of the wearable electronic device, whether to perform an action, wherein the determining is based on a duration of time between receiving the first depression of the button and receiving the second depression of the button and at least one of: a display state of the wearable electronic device, an orientation of the wearable electronic device, and motion of the wearable electronic device; and performing the action if:
the duration of time does not exceed a gap threshold; and
the orientation of the wearable electronic device during a period of time in which the first depression of the button and the second depression of the button are received corresponds to a viewing orientation for viewing the wearable electronic device by a user.

12. A method for operating a wearable electronic device, the method comprising:

receiving, with a button of the wearable electronic device, a first depression of the button and a second depression of the button;

determining, with a processor of the wearable electronic device, whether to perform an action, wherein the determining is based on a duration of time between receiving the first depression of the button and receiving the second depression of the button and at least one of: a display state of the wearable electronic device, an orientation of the wearable electronic device, and motion of the wearable electronic device; and performing the action if:
the duration of time does not exceed a gap threshold; and
the motion of the wearable electronic device during a period of time in which the first depression of the button and the second depression of the button are received does not exceed a motion threshold.

* * * * *